J. W. BLOCK.
OILING DEVICE.
APPLICATION FILED JAN. 22, 1909. RENEWED AUG. 21, 1914.
1,132,701.
Patented Mar. 23, 1915.
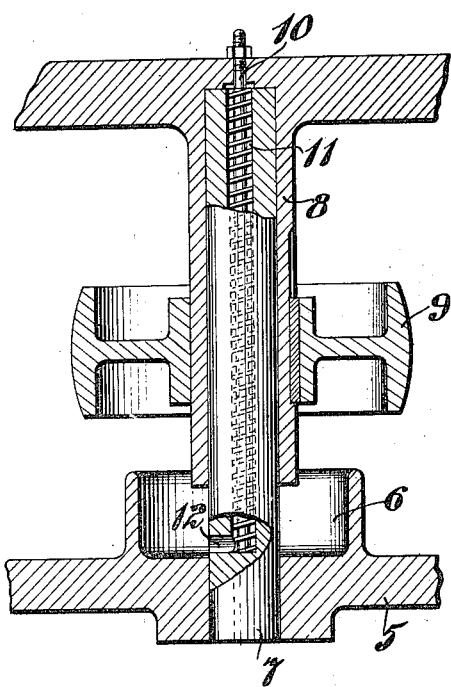
Witnesses:
M. A. Milord
C. B. Benjamin
Inventor:
John W. Block
By Frederick Benjamin
Atty.

UNITED STATES PATENT OFFICE.

JOHN W. BLOCK, OF JOLIET, ILLINOIS.

OILING DEVICE.

1,132,701.     Specification of Letters Patent.     Patented Mar. 23, 1915.

Application filed January 22, 1909, Serial No. 473,671. Renewed August 21, 1914. Serial No. 857,949.

*To all whom it may concern:*

Be it known that I, JOHN W. BLOCK, citizen of the United States, residing at Joliet, in the county of Will and State of Illinois, have invented certain new and useful Improvements in an Oiling Device, of which the following is a specification.

This invention relates to improvements in means for applying lubricants to vertically arranged shafts or spindles whereby the oil will be continuously and automatically conducted to the bearing, against the force of gravity, from an oil chamber or receptacle.

The especial object of the improvements which form the subject matter of this application is to provide shaft lubricating means which will positively, automatically and effectively conduct the lubricant to the surface of the bearings to be lubricated, against the action of gravity, and in which any excess of oil will be caught and returned to such bearings without waste.

For the purpose of showing the principles involved in my invention and not as a demonstration of a particular mechanical application thereof, I submit herewith a drawing illustrating one method of carrying out my invention.

The figure represents in section an upright stationary shaft, carrying rotatable members and indicating one method of applying my invention.

Referring to the details of the figure, 5 represents a stationary base or support in which is fixed an upright shaft 7. On the upper side of the base and surrounding the lower portion of the shaft is an oil-chamber or receptacle 6. Rotatably mounted on the shaft is a member having a tubular extension or sleeve 8 which surrounds the shaft for the greater part of its length and is in frictional contact therewith. On this sleeve is fixed a pulley 9 which may be driven by any suitable power, the driving means not being shown. The shaft has an axial bore 11 the lower end of which communicates with the chamber 6 by a radial bore 12, and the upper end of the bore 11 is open. Secured to the member 8 so as to rotate therewith is a rod 10 having male helical threads thereon, said rod extending the full length of the axial bore of the shaft 7, thereby serving when the pulley is driven in the proper direction as a spiral conveyer of oil which enters said bore from the chamber 6 through the bore 12.

It will be seen that the oil will be forced or carried by the spiral rod against gravity to the upper end of the shaft where it will overflow the top of the shaft and down along the sides of the latter thus lubricating the contiguous surfaces of shaft and sleeve. The excess oil will drop into the chamber 6 to be used again in the manner indicated.

I am aware that spiral conveyers are not new and that various means have been used for forcing lubricants to the bearings to be lubricated, so I do not broadly claim such, but

What I claim is:—

1. Oiling means comprising a base having an oil-chamber therein, an upright shaft fixed in said base, said shaft having an oil-channel therein extending to the upper end of said shaft, and having a lateral channel communicating with said oil-chamber and said first named channel, and rotatable means arranged in said shaft for forcing oil from said oil-chamber through said channels.

2. Oiling means comprising a base having an oil-chamber therein, an upright stationary shaft passing through said chamber, said shaft having an axial bore and a lateral channel communicating with said bore and chamber, an element rotatably mounted on said shaft and a spiral conveyer arranged in said bore and operated by said rotatable element.

3. Oiling means comprising a base having an oil-chamber therein, an upright shaft fixed on said base, said shaft having an oil-channel therein extending to the upper end of said shaft and having a lateral channel communicating with said oil-chamber and said first-named channel, and means actuated independently of said shaft for forcing oil from said chamber through said channels to the upper end of said shaft.

In testimony whereof I affix my signature in the presence of two witnesses.

JOHN W. BLOCK.

Witnesses:
F. BENJAMIN,
M. A. MILORD.